(12) United States Patent
Althammer et al.

(10) Patent No.: US 8,052,237 B2
(45) Date of Patent: Nov. 8, 2011

(54) DEEP-DRAWN CONTAINER AND METHOD FOR PRODUCING SAME

(75) Inventors: Hans Althammer, Heidenheim (DE); Carsten Jung, Herbrechtingen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 278 days.

(21) Appl. No.: 11/794,208

(22) PCT Filed: Nov. 29, 2005

(86) PCT No.: PCT/EP2005/056298
§ 371 (c)(1),
(2), (4) Date: Jun. 21, 2007

(87) PCT Pub. No.: WO2006/069874
PCT Pub. Date: Jul. 6, 2006

(65) Prior Publication Data
US 2008/0092585 A1    Apr. 24, 2008

(30) Foreign Application Priority Data

Dec. 23, 2004   (DE) .................. 10 2004 062 309

(51) Int. Cl.
*A47B 96/04*    (2006.01)
(52) U.S. Cl. ...................... 312/408; 312/410
(58) Field of Classification Search ............. 312/400, 312/401, 405, 406, 406.1, 408, 410
See application file for complete search history.

(56) References Cited

U.S. PATENT DOCUMENTS

| | | | | |
|---|---|---|---|---|
| 1,861,123 | A | * | 5/1932 | Kuckel .......... 312/293.2 |
| 1,997,793 | A | * | 4/1935 | Hull et al. ........ 312/408 |
| 2,620,255 | A | * | 12/1952 | Beckett .......... 312/351 |
| 3,331,646 | A | * | 7/1967 | Peters .......... 312/270.3 |
| 3,669,520 | A | * | 6/1972 | Jansen .......... 312/408 |
| 4,195,888 | A | * | 4/1980 | Squire .......... 312/408 |
| 4,735,468 | A | * | 4/1988 | Taylor et al. ...... 312/408 |
| 5,692,817 | A | * | 12/1997 | Jun et al. .......... 312/408 |
| 5,855,424 | A | * | 1/1999 | Hamilton et al. .... 312/408 |
| 6,729,705 | B2 | * | 5/2004 | Wolanin et al. ..... 312/408 |
| 2004/0263038 | A1 | * | 12/2004 | Ribolzi et al. ...... 312/408 |
| 2006/0163985 | A1 | * | 7/2006 | Blersch et al. ...... 312/408 |
| 2008/0048540 | A1 | * | 2/2008 | Kim .......... 312/408 |

FOREIGN PATENT DOCUMENTS

| | | | |
|---|---|---|---|
| EP | 0 535 520 | 4/1993 | |
| EP | 0 582 785 | 2/1994 | |
| EP | 0 641 941 | 3/1995 | |
| EP | 1 030 144 | 8/2000 | |
| JP | 01107080 | * 4/1989 | .......... 312/406 |

OTHER PUBLICATIONS

International Search Report PCT/EP2005/056298.

* cited by examiner

*Primary Examiner* — Hanh V Tran
(74) *Attorney, Agent, or Firm* — James E. Howard; Andre Pallapies

(57) ABSTRACT

A deep-drawn inner coating or an inner door of a cooling equipment. An insertion element is maintained by form-closure in a recess of a wall. In order to facilitate the accurate fixing of the position of a component incorporated in the insertion element, the insertion element extends at least up to a plane flush with a surface of the wall surrounding the recess.

20 Claims, 4 Drawing Sheets

DEEP-DRAWN CONTAINER AND METHOD FOR PRODUCING SAME

The present invention relates to a cooling device comprising an inner lining and/or an inner door and to a method for the production thereof.

The housing of a cooling device and door thereof generally has a multilayered structure, comprising a rigid outer skin, a one-piece inner container deep-drawn from a plastic sheet bar and serving as an inner lining or inner door, and an insulating layer which fills a space between the inner container and the outer skin. The production of the inner containers by means of deep-drawing is simple and cheap, but the dimensions of the containers produced in this way can vary quite widely in comparison to other production techniques. This can lead to problems if other parts with narrow tolerances have to be assembled in or on the container.

EP 0 535 520 A1 describes an inner container of a cooling device in which an insertion element is held in a form-closed manner in a recess of the container wall. The insertion element is anchored in the container wall during the deep drawing, a sheet bar from which the container is to be formed being fitted snugly with a drawing die to which the insertion element is fastened in advance. The insertion element is held during the deep drawing on a pivot projecting from a wall surface of the drawing die a short distance in front of the wall surface such that during deep drawing sheet-bar material penetrates the space between the insertion element and the wall surface and thereby anchors the insertion element to the container.

As already stated, the production tolerances in deep drawing are quite high. The case can easily arise whereby the sheet bar in the area surrounding the insertion element does not exactly abut the wall surface of the drawing die, so that the finished container wall is indented in the area surrounding the insertion element. It is difficult to ensure that during deep drawing the sheet bar abuts in the space between the wall surface of the drawing die and the insertion element the complete contour of the pivot supporting the insertion element. The forms of the inlet openings of the recesses receiving the deep-drawing components can therefore vary.

Such production imponderables give an observer the impression that the finished inner container is of poor quality, and they make it difficult to use the insertion elements for assembling built-in components with low positional tolerances.

The object of the invention is to provide a cooling device comprising a deep-drawn inner lining and/or a deep-drawn inner door as well as a method for production thereof which simplify the assembly of built-in components with low tolerances on the inner lining or the inner door.

The object is achieved firstly in a cooling device comprising features presented herein. As in the case of the inner lining and/or the inner door of such a cooling device the insertion element extends out of the recess at least up to a plane of the inner lining or of the inner door flush with the surface of a wall surrounding the recess, the insertion element can itself serve as a stop for the positioning of a built-in component. Since the positions of the insertion components in relation to a deep-drawing die used for producing the inner lining or the inner door are more precisely defined than those of areas of the lining or door wall surrounding them, a built-in component can reliably be assembled precisely using the insertion elements as a stop.

The insertion element preferably projects above the flush plane. A built-in component can then be assembled so as to abut a stop face of the insertion element projecting above the surrounding surface of a lining or door wall.

In order to produce form closure between the inner lining or inner door and insertion element, the insertion element can usefully be equipped with a tongue encompassed wall of the inner lining or of the inner door.

Alternatively or in combination with this tongue, a groove can also be provided on the insertion element, engages with the lining wall or the door wall.

In order to simplify the introduction of the material of the inner-door wall or of the inner-lining wall into the groove during deep drawing, the width of the groove should be at least equal to the thickness of the inner-door wall or of the inner-lining wall in the area surrounding the recess. A cross-section of the groove that broadens toward an open side also facilitates the penetration of the wall material.

In order to conceal a possibly unevenly deep penetration of the material of the inner-door wall or of the inner-lining wall into the groove, the groove can usefully be defined on one side by a circumferential flange flush with the surrounding surface of the inner-door wall or of the inner-lining wall.

Also, an inner lining or an inner door of the type described above is obtained whereby the insertion element is fastened to the drawing die so as to abut a plane surface of the drawing die or to engage with a recess of the drawing die, a sheet bar made of a plastic material is drawn onto the drawing die in order to form the inner lining or the inner door, the fastening of the drawing die is discontinued and the inner lining or the inner door together with the enclosed insertion element is then detached from the drawing die.

Further features and advantages of the present invention will emerge from the description below of exemplary embodiments, based on the example of an inner lining of a cooling device with reference to the enclosed drawings.

FIGS. 1 to 4 each show a partial section through a drawing die carrying an insertion element and a wall of a cooling device inner lining enclosing the insertion element and on the drawing die;

Figure 1:
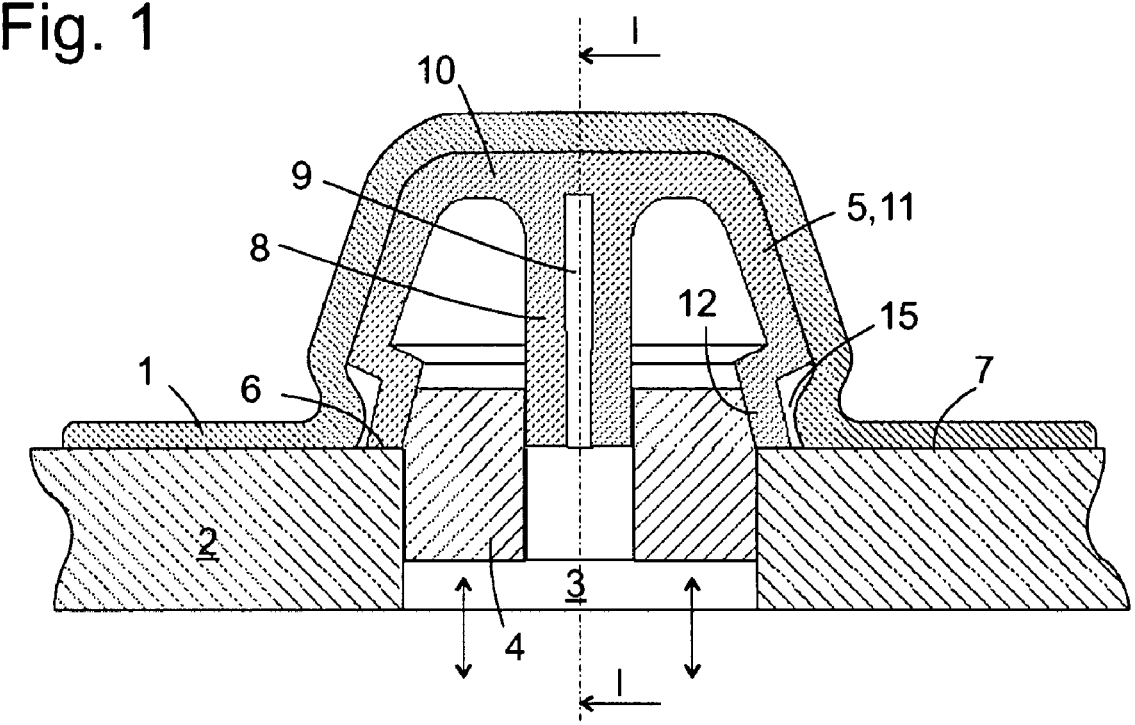

FIG. 1 shows a section through a part of a wall 1 of a cooling-device inner container made of deep-drawable plastic, drawn up onto a drawing die 2. An insertion element 5 is fastened to a holder 4 displaceable in a bore 3 of the drawing die 2. The insertion element 5, which is rotationally symmetrical about an axis I-I in the sectional plane, has approximately the shape of an inverted cup, whose edge 6 is pressed by the holder 4 against the wall surface 7, surrounding the bore 3, of the drawing die. The wall surface 7 is—at least in the area surrounding the bore 3 shown in the figure—planar.

A cylindrical pivot 8, on which the holder 4 catches, projects from the upwardly turned cup floor 10 of the insertion element 5. A central bore 9 of the pivot 8 is provided in order to receive a screw 30, by means of which a built-in component 40 is screwed so as to abut the inside of the wall 1 in the finished inner container. The circumferential side wall 11 of the cup-shaped insertion element 5 has in the proximity of the edge 6 a narrowed section 12 such that the side wall 11, together with the wall surface 7, forms a circumferential groove into which the wall 1 penetrates during deep drawing and thereby envelopes the insertion element 5 in a form-closed manner.

Figure 2:
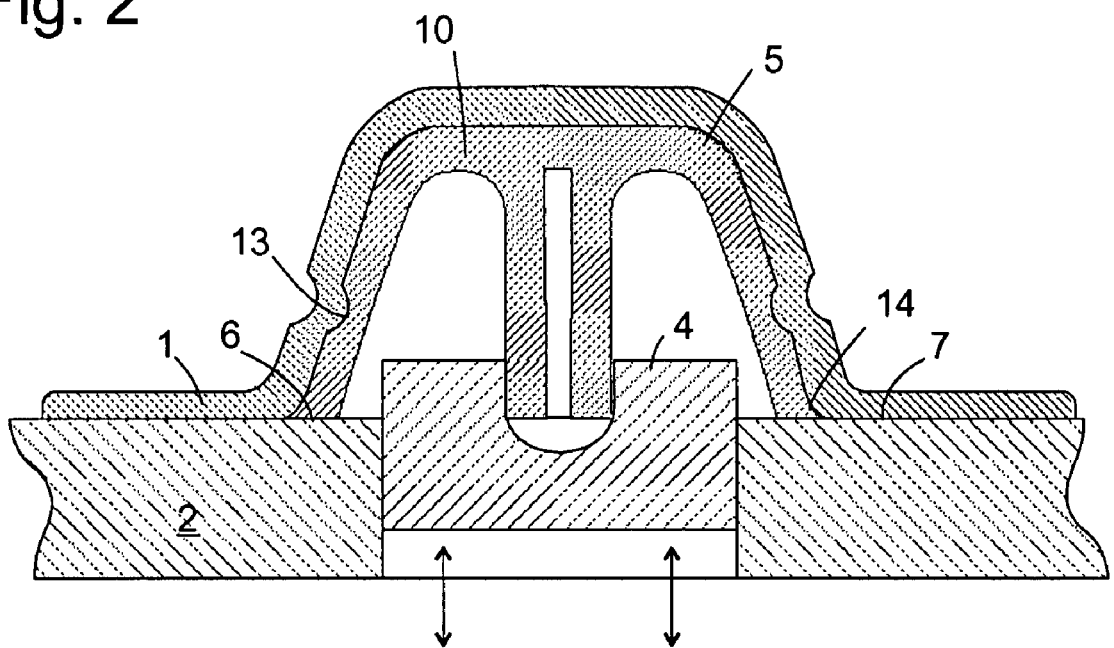

FIG. 2 shows, according to a second embodiment of the invention, a section through an inner container wall 1, a drawing die 2 and an insertion element 5 held by a displaceable holder 4 so as to abut the wall surface 7 of the drawing die 2. In this embodiment, a circumferential groove 13 is formed on the circumferential side wall 11 of the cup-shaped insertion element 5 at a distance both from the edge 6 and from the cup floor 10. The groove 13 has a rounded cross section, and its width is greater than its depth such that the wall 1 can easily completely fill the cross section of the groove 13. In the immediate proximity of the edge 6, the side wall 11 has a curved section 14 to which the wall 1 can fit completely snugly such that, as shown in FIG. 1, no gap 15 in which waste that is difficult to remove can collect can occur between the wall 1 and the edge 6.

In the embodiment shown in FIG. 3, elements which have already been described with reference to the preceding embodiments are designated with the same reference characters and are not described again in detail. The circumferential side wall 11 supports on the one hand a circumferential flange 16 abutting flush to the wall surface 7 and on the other a circumferential rib 18, separated from the flange 16 by a groove 17. The groove 17 has in its entrance area a width b which is greater than the thickness d of the wall 1 in the area surrounding the insertion element 5. During the deep drawing, the wall 1 fits snugly with the rib 18 and also penetrates into the groove 17 such that the rib 18 functions as a tongue which engages with a groove in the wall 1 which has developed during deep drawing and in this way anchors the insertion element 5 in a form-closed manner. It is not necessary for the material of the wall 1 to penetrate the groove 17 that narrows toward its base as far as the base, since a gap 15 which remains after the deep drawing is shielded by the flange 16 against the inside of the container and cannot therefore collect waste.

Figure 3:
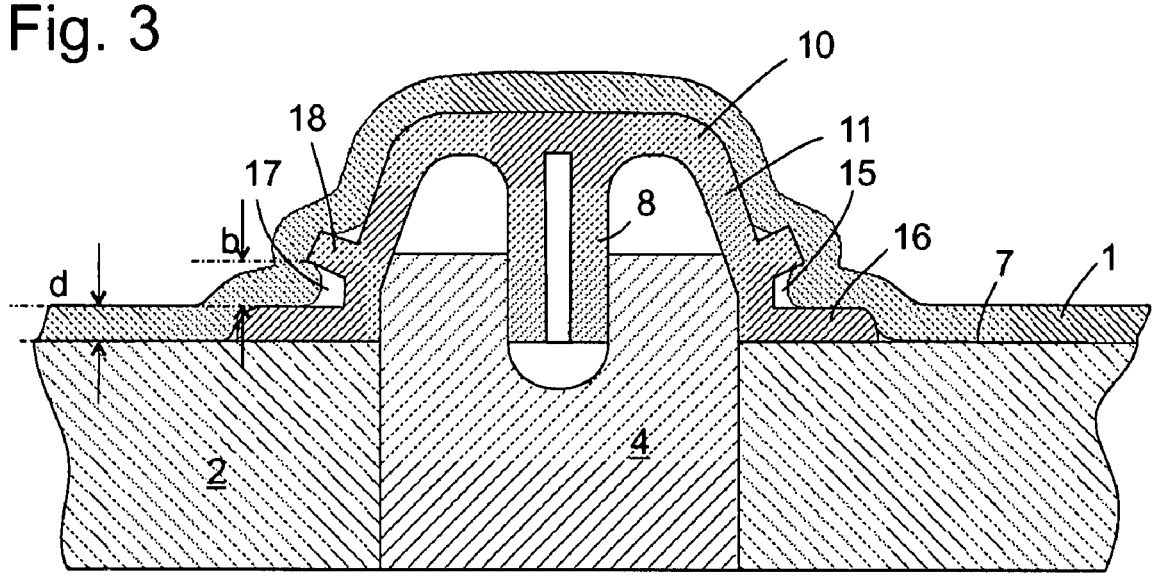
Figure 4:
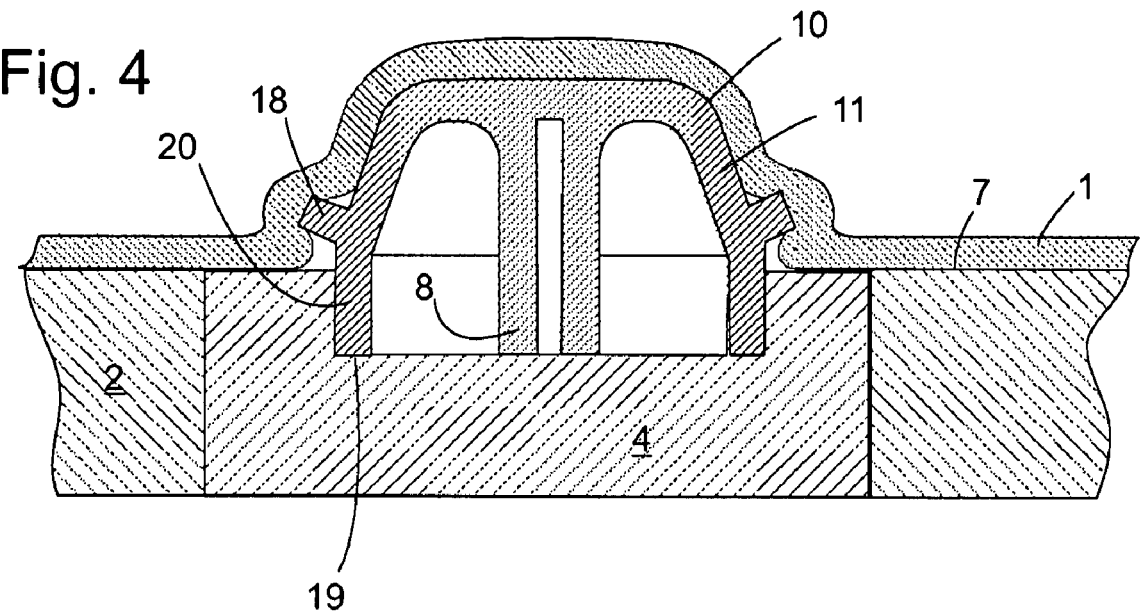

The insertion element 5 in the embodiment shown in FIG. 4 differs from that shown in FIG. 3 through the absence of the flange 16; instead, the side wall 11 is extended beyond the wall surface 7 by a cylindrical section 20 which engages with a recess of the displaceable holder 4. After removal of the finished container from the mold, the front face 19 of the extension section 20 or of the correspondingly extended pivot 8 forms a stop face on which any built-in components can be positioned exactly, irrespective of how precisely during deep drawing the wall 1 has abutted the wall surface 7 of the drawing die 2.

Figure 5:
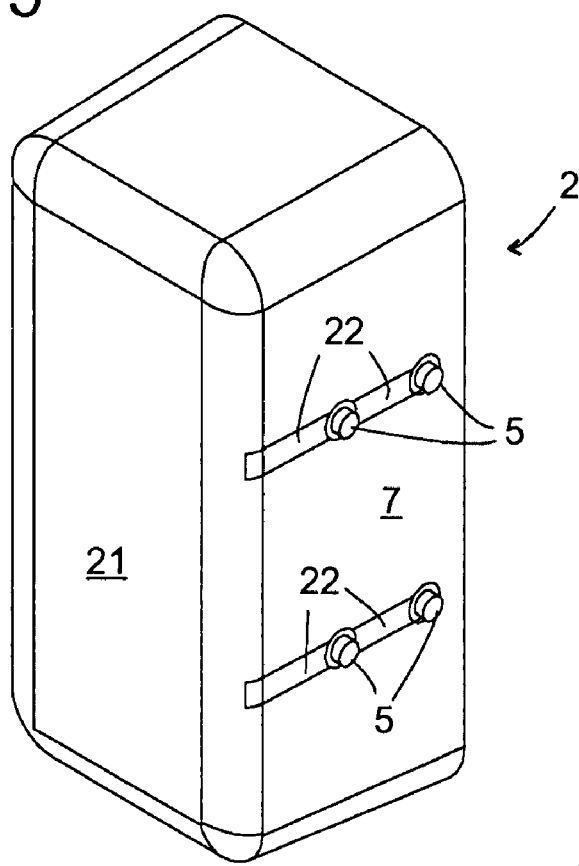
FIG. 5 shows a schematic perspective view of a drawing die which can be used for executing the invention prior to a deep-drawing process.
Figure 6:
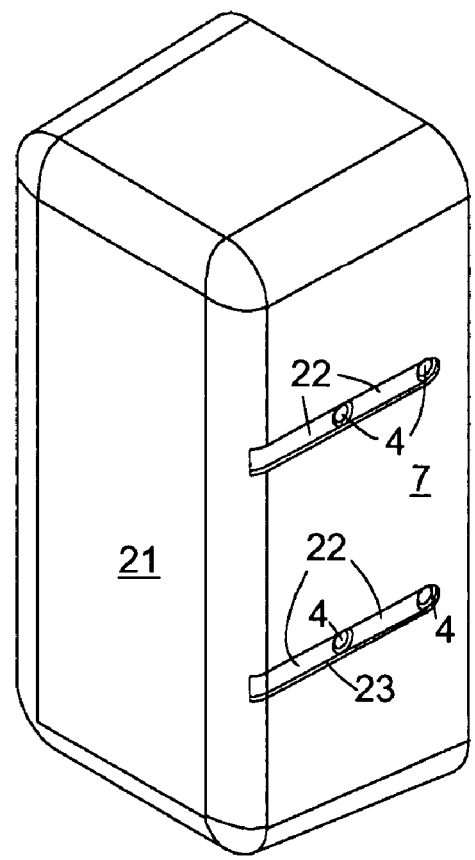
FIG. 6 shows the same drawing die after the deep-drawing process.
Figure 7:
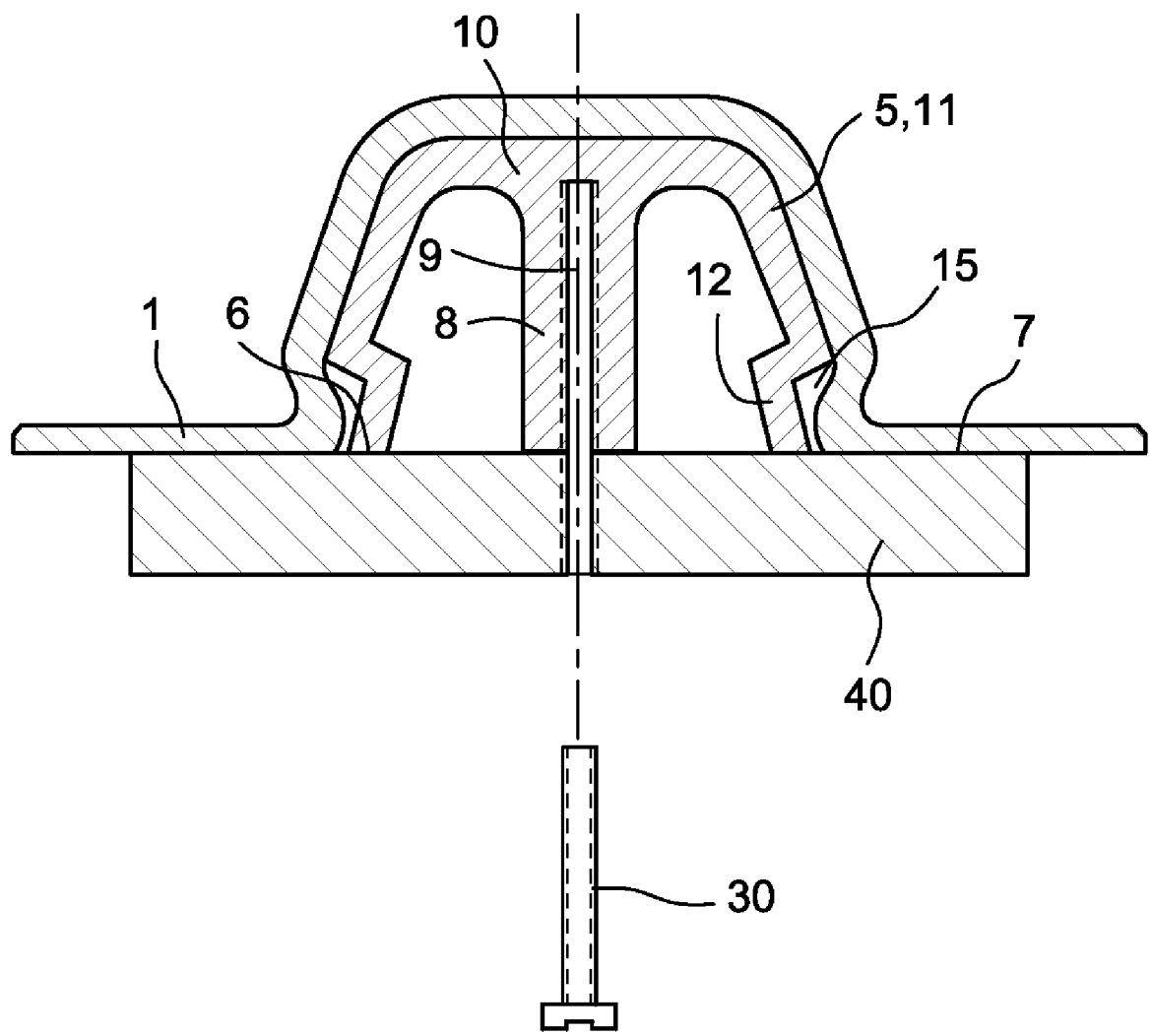
FIG. 7 shows a partial section of an insertion element and a wall of a cooling device inner lining which support a built-in element.

FIG. 5 shows a perspective schematic view of a drawing die 2 which is suitable for producing an inner container for a cooling device comprising insertion elements 5 anchored in the wall according to the embodiment shown in FIG. 4. Four insertion elements 5 are mounted on the side wall surface 7 of this drawing die 2. Between two insertion elements 5 mounted at equal height and between a respective rear of these insertion elements and a rear side 21 of the drawing die 2, the drawing die has lowerable elements 22. After a plastic sheet bar has been drawn onto the drawing die such that it envelops in a form-closed manner the parts of the insertion elements 5 projecting beyond the wall surface 7, the holders 4 and the lowerable elements 22 are retracted into the interior of the drawing die, as shown in FIG. 6, such that parallel grooves 23 open toward the rear side 21 are produced in the side surfaces of the drawing die 2, which grooves make it possible to detach the finished container together with the extension sections 20 projecting into its interior from the drawing die 2.

The invention described on the basis of the example of the cooling-equipment inner container can also be applied correspondingly in cooling-equipment inner doors made of deep-drawn plastic.

The invention claimed is:

1. A cooling device comprising:
a deep-drawn inner lining;
an insertion element being held within a recess of a wall of the inner lining, said recess having a closed structure such that the insertion element is enveloped within the recess, said closed structure of the inner lining having a first interlocking part and the insertion element having a second interlocking part, interlocked with the first interlocking part, said second interlocking part being formed in one piece with the insertion element, whereby the insertion element and the wall interlock and engage one another in a form-closed manner to secure the insertion element in position within the recess; and
wherein the insertion element has an end that is in a common plane with a surface of the wall surrounding the recess.

2. The cooling device as claimed in claim 1, wherein the inner lining is produced from plastic.

3. The cooling device as claimed in claim 1, further comprising a built-in component mounted on the insertion element so as to abut a stop face flush with the surface of the wall surrounding the recess.

4. The cooling device as claimed in claim 1, wherein the insertion element comprises a tongue of the insertion element encompassed by the wall.

5. The cooling device as claimed in claim 1, wherein the insertion element comprises a groove of the insertion element, with which groove the wall engages.

6. The cooling device as claimed in claim 5, wherein the width of the groove is at least equal to the thickness of the wall.

7. The cooling device as claimed in claim 5, wherein the width of the groove increases toward an open side.

8. The cooling device as claimed in claim 5, wherein the groove is defined on one side by a circumferential flange flush with the surface of the wall surrounding the recess.

9. The cooling device as claimed in claim 1, wherein at least one further insertion element is held in a further recess of the wall, and the insertion elements jointly support a built-in component.

10. A method for producing a cooling device comprising an inner lining according to claim 1, wherein the insertion element is fastened to a drawing die for the deep-drawn inner lining, a sheet bar made of a plastic material is drawn on to the drawing die in order to form the inner lining, the fastening of the insertion element is discontinued and the inner lining is detached from the drawing die, wherein the insertion element is fastened so as to abut a plane surface of the drawing die or to engage with a recess of the drawing die.

11. The cooling device as claimed in claim 1, further comprising a cylindrical member extending from a floor of the insertion element, said cylindrical member including a central bore to receive a screw to secure a built-in component.

12. The cooling device as claimed in claim 1, wherein the insertion element includes a stop surface arranged and configured to position a built-in component.

13. A cooling device comprising:
a deep-drawn inner lining;

an insertion element being held within a recess of a wall of the inner lining, said recess having a closed structure such that the insertion element is enveloped within the recess whereby the insertion element and the wall interlock and engage one another in a form-closed manner to secure the insertion element in position within the recess such that the insertion element is anchored to the inner lining solely by interlocking parts provided between the inner lining and the insertion element with the interlocking part of the insertion element being formed in one piece with the insertion element; and wherein the insertion element has an end that is in a common plane with a surface of the wall surrounding the recess such that the end of the insertion element and the surface of the wall surrounding the recess reside substantially on the same plane.

14. The cooling device as claimed in claim 13, further comprising a cylindrical member extending from a floor of the insertion element, said cylindrical member including a central bore to receive a screw to secure a built-in component.

15. The cooling device as claimed in claim 13, wherein the insertion element includes a stop surface arranged and configured to position a built-in component.

16. A cooling device comprising:
a deep-drawn inner lining; and
an insertion element being held within a recess of a wall of the inner lining, said recess having a closed structure such that the insertion element is enveloped within the recess, said closed structure of the inner lining having a first interlocking part and the insertion element having a second interlocking part, interlocked with the first interlocking part, said second interlocking part being formed in one piece with the insertion element, whereby the insertion element and the wall including mating surfaces that interlock and engage one another in a form-closed manner to secure the insertion element in position within the recess;

wherein the insertion element has an end that extends at least up to a common plane with a surface of the wall surrounding the recess, and wherein the insertion element includes a stop surface arranged and configured to position a built-in component.

17. The cooling device as claimed in claim 16, wherein a width of the insertion element is greater than a width of the recess.

18. The cooling device as claimed in claim 16, wherein the insertion element includes a closed end facing towards the lining and an open end oriented towards the common plane.

19. A cooling device comprising:
a deep-drawn inner lining;
an insertion element being held within a recess of a wall of the inner lining, said recess having a closed structure such that the insertion element is enveloped within the recess whereby the insertion element and the wall interlock and engage one another in a form-closed manner to secure the insertion element in position within the recess; and wherein the insertion element has an end that is in a common plane with a surface of the wall surrounding the recess, further comprising a cylindrical member extending from a floor of the insertion element, said cylindrical member including a central bore to receive a screw to secure a built-in component.

20. A cooling device comprising:
a deep-drawn inner lining;
an insertion element being held within a recess of a wall of the inner lining, said recess having a closed structure such that the insertion element is enveloped within the recess whereby the insertion element and the wall interlock and engage one another in a form-closed manner to secure the insertion element in position within the recess; and wherein the insertion element has an end that is in a common plane with a surface of the wall surrounding the recess such that the end of the insertion element and the surface of the wall surrounding the recess reside substantially on the same plane, further comprising a cylindrical member extending from a floor of the insertion element, said cylindrical member including a central bore to receive a screw to secure a built-in component.

\* \* \* \* \*